Figure 1:
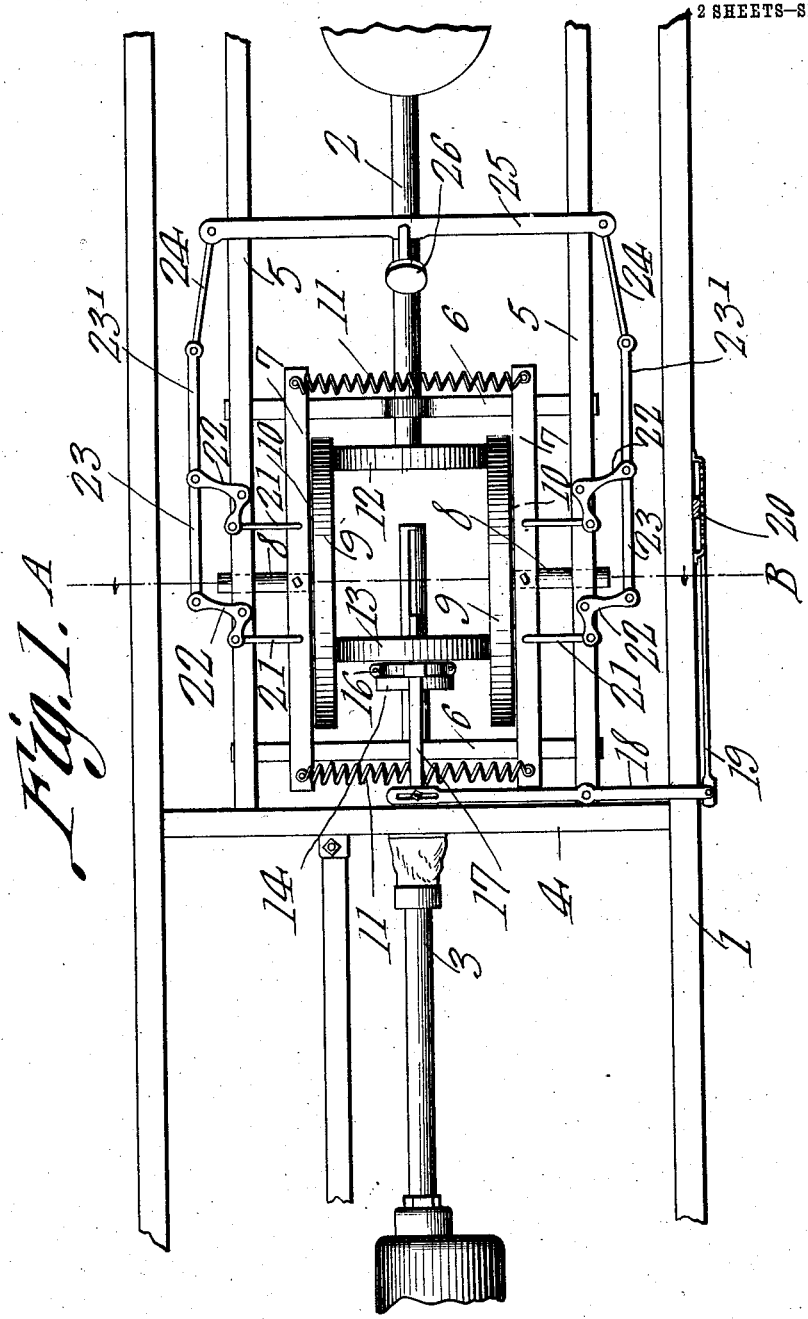

N. G. ROBINSON.
TRANSMISSION GEARING.
APPLICATION FILED FEB. 25, 1911.

1,010,804.

Patented Dec. 5, 1911.
2 SHEETS—SHEET 1.

Witnesses

N. G. Robinson
Inventor
by C. A. Snow & Co.
Attorneys

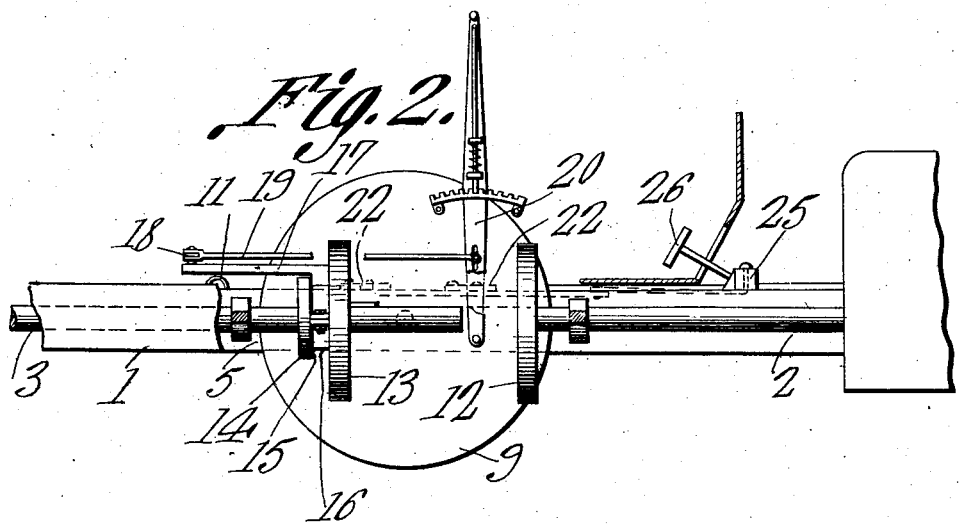
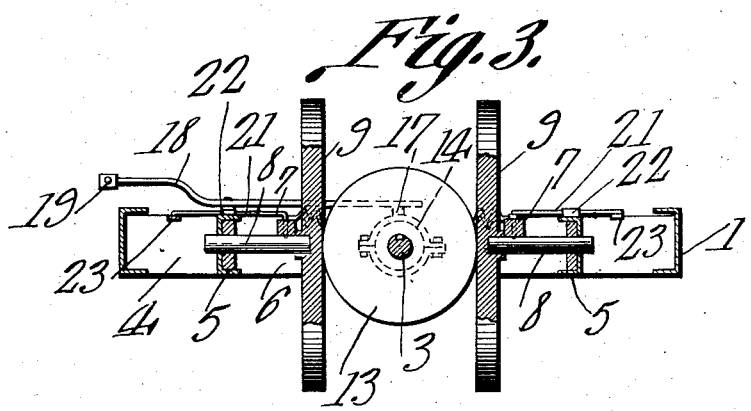

UNITED STATES PATENT OFFICE.

NATHANIEL G. ROBINSON, OF WOOLSTOCK, IOWA.

TRANSMISSION-GEARING.

1,010,804.  Specification of Letters Patent.  Patented Dec. 5, 1911.

Application filed February 25, 1911. Serial No. 610,804.

*To all whom it may concern:*

Be it known that I, NATHANIEL G. ROBINSON, a citizen of the United States, residing at Woolstock, in the county of Wright and State of Iowa, have invented a new and useful Transmission-Gearing, of which the following is a specification.

This invention relates to transmission gearing especially designed for use upon motor vehicles.

One of the objects of the invention is to provide friction gearing assembled in a novel manner whereby the speed of rotation of the driving shaft can be readily varied at will and said shaft reversed so as to cause the vehicle to travel backwardly at any desired speed.

A further object is to provide improved means for holding the gears in frictional engagement, said means being shiftable to disconnect the engine shaft from the driving shaft and to permit ready adjustment of the speed controlling gearing.

With the foregoing and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a plan view of transmission gearing constructed in accordance with the present invention. Fig. 2 is a side elevation of the structure shown in Fig. 1, one of the friction disks and a portion of the link connection between the controlling lever and the gear shifting lever being removed. Fig. 3 is a section on line A—B Fig. 1.

Referring to the figures by characters of reference 1 designates a portion of the frame of a motor vehicle and the engine shaft has been indicated 2 while the driving shaft has been indicated at 3. The frame 1 includes a cross strip 4 and parallel longitudinally extending members 5, these last mentioned members being connected by cross strips 6 in which the shafts 2 and 3 are journaled. Guide members 7 are slidably mounted on the cross strips 6 and journaled within each of these members 7 and in one of the adjoining longitudinal strips 5, is a shaft 8 having a friction disk 9 secured thereto. Anti-friction devices, such as rollers 10, are interposed between the members 7 and the adjacent disks 9. The two members 7 are connected, at their ends, by springs 11 which serve to draw the disks 9 firmly against opposite portions of a friction gear 12 which is secured to one end of shaft 2, and against opposite portions of a friction gear 13 which is feathered on the driving shaft 3. These two gears 12 and 13 contact with the disks 9 at diametrically opposed points and the gear 13 has a collar 14 grooved annularly as shown at 15 for the reception of a ring 16. This ring has an arm 17 extending therefrom and fixed relative thereto, said arm being pivotally connected to the slotted end of a lever 18. The other end of this lever is connected by a link 19 to a controlling lever 20 located at a point where it can be conveniently reached by the operator. Each of these slidable members 7 is connected, by links 21, to bell crank levers 22 fulcrumed on one of the longitudinal frame members 5, these bell crank levers being connected by a link 23 having a projecting end portion 23'. This end portion is connected by a link 24 to a slide 25 mounted on the longitudinal frame members 5. The links 24 connected to the two extensions 23' extend from the ends of the slide 25 and a foot plate 26 is connected to the middle portion of said slide and is located at a point where it can be conveniently reached by the operator. The shafts 8 are journaled within the slidable members 7 but cannot shift longitudinally relative thereto. Said shafts however, are capable of sliding within longitudinal frame members 5 and it will be apparent, therefore, that when the foot plate 26 and the slide 25 are pressed forwardly by the operator, the bell crank levers 22 will be simultaneously swung upon their fulcrums so as to pull on links 21 and thus shift the slidable members 7 laterally and move the disks 9 in opposite directions against the stress of springs 11 and out of contact with gears 12 and 13. With the disks 9 thus shifted, it will be apparent that the engine shaft 2 and its gear 12 are free to rotate without motion being transmitted therefrom to the gear 13 and the driving shaft 3. When the foot plate 26 is released, however, the springs 11 promptly move the disks 9 toward each other and into contact with opposite portions of the gears 12 and 13, at the same time drawing the slide 25 and the parts connected thereto back to their initial positions. The gear 12, if rotating, will thus revolve the disks 9 in opposite directions and motion will be transmitted from these disks to the gear 13 and said gear will in turn rotate the shaft 3. When it is desired to change the speed of the shaft 3 or to reverse the movement thereof, the disks 9 are shifted out of engagement with the gears 12 and 13, in the manner hereinbefore described, and gear 13 is shifted longitudinally along shaft 3 by operating the controlling lever 20 which thus transmits motion, through the link 19, lever 18 and arm 17 to the gear 13. By moving the gear 13 toward the centers of the disks 9, the speed of the shaft 3 will be reduced whereas, by moving gear 13 toward the peripheries of disks 9 the speed of said shaft will be increased. By moving gear 13 across the centers of the disks, the movement of the shaft will be reversed. As soon as the gear 13 has been adjusted to a desired point, the foot plate 26 is released and the disks 9 will therefore be shifted automatically into frictional engagement with the gears and motion will be transmitted from the engine shaft to the driving shaft in the manner hereinbefore described. By connecting the springs 11 to the slidable members 7 in the manner as shown and described, it will be apparent that the disks and gears will be held constantly in frictional engagement and any wear upon the parts will be promptly taken up automatically.

What is claimed is:—

Transmission gearing including a drive gear, a driven gear, slidable members adjacent opposite portions of the gears, bell crank levers adjacent each of said members, link connections between said levers and the member, a shaft journaled in each member, a friction disk revoluble with each shaft, said disks contacting with opposite portions of the gears, spring connections between the slidable members for holding the disks normally in contact with the gears, and means under the control of an operator for simultaneously shifting the levers to move the slidable members in opposite directions and disengage the disks from the gears.

In testimony that I claim the foregoing as my own, I have hereto affixed my signature in the presence of two witnesses.

NATHANIEL G. ROBINSON.

Witnesses:
T. W. Soop,
Oliver Elefson.

---

Copies of this patent may be obtained for five cents each, by addressing the "Commissioner of Patents, Washington, D. C."